US007912778B2

(12) United States Patent
Nanjundamoorthy

(10) Patent No.: US 7,912,778 B2
(45) Date of Patent: Mar. 22, 2011

(54) SYSTEMS, METHODS AND COMPUTER PROGRAM PRODUCTS FOR PROCESSING ORDERS SUBJECT TO INVESTMENT RESTRICTIONS

(75) Inventor: Hari Nanjundamoorthy, West Windsor, NJ (US)

(73) Assignee: CheckFree Corporation, Norcross, GA (US)

( * ) Notice: Subject to any disclaimer, the term of this patent is extended or adjusted under 35 U.S.C. 154(b) by 448 days.

(21) Appl. No.: 11/389,909

(22) Filed: Mar. 27, 2006

(65) Prior Publication Data

US 2007/0226120 A1 Sep. 27, 2007

(51) Int. Cl.
*G06F 17/60* (2006.01)

(52) U.S. Cl. .............. 705/37; 705/35; 705/36 R; 705/38

(58) Field of Classification Search .................. None
See application file for complete search history.

(56) References Cited

U.S. PATENT DOCUMENTS

| 7,249,080 | B1 * | 7/2007 | Hoffman et al. | 705/35 |
| 2001/0042040 | A1 * | 11/2001 | Keith | 705/37 |
| 2003/0225663 | A1 * | 12/2003 | Horan et al. | 705/36 |
| 2003/0233304 | A1 * | 12/2003 | Dhurandhar et al. | 705/36 |
| 2005/0108141 | A1 * | 5/2005 | Farrell et al. | 705/37 |
| 2005/0228735 | A1 * | 10/2005 | Duquette | 705/37 |
| 2006/0080217 | A1 * | 4/2006 | Blackall et al. | 705/37 |
| 2006/0190386 | A1 * | 8/2006 | Levy | 705/37 |
| 2006/0200400 | A1 * | 9/2006 | Hunter et al. | 705/36 R |
| 2006/0235785 | A1 * | 10/2006 | Chait et al. | 705/37 |
| 2007/0192223 | A1 * | 8/2007 | Cifrese et al. | 705/36 R |

OTHER PUBLICATIONS

Standard or non-standard, that is the question by Barry McCall Aug. 27, 2003.*
State Prices Implicit in Valuation formulae for Derivative Securities by Rady Sven; Jan. 1994; revised Oct. 1995; 15 pages.*

* cited by examiner

*Primary Examiner* — Shahid R Merchant
*Assistant Examiner* — Mary Gregg
(74) *Attorney, Agent, or Firm* — Sutherland Asbill & Brennan LLP

(57) ABSTRACT

Methods and systems process multiple trade orders subject to investment account restrictions. The restrictions are associated with the holding of one or more securities or with a cash position in an investment account. Each received order to perform an investment account management action is processed to determine whether performance of the action violates any stored restriction. The investment account is updated to reflect the result of executing the orders that did not violate any stored restriction. All received orders that are found to be in violation of a restriction are then processed again to determine whether performance of the action now violates any stored restriction. This technique allows for approving for execution as many trade orders subject to restrictions as possible.

22 Claims, 4 Drawing Sheets

SYSTEMS, METHODS AND COMPUTER PROGRAM PRODUCTS FOR PROCESSING ORDERS SUBJECT TO INVESTMENT RESTRICTIONS

FIELD OF THE INVENTION

The present invention relates to investment portfolio management, and more particularly to methods, systems and computer program products for the automated processing of trade orders subject to investment restrictions.

BACKGROUND OF THE INVENTION

Investment accounts hold stocks, bonds, mutual funds, and the like for individuals, trusts, corporations, and other investors. Investors typically utilize such accounts to achieve long and short term savings goals and as an aid in tax planning. The holdings of an investment account may be manipulated by the investor, such as by an investor executing securities purchases or sales via a graphical user interface and an Internet connection. An investor can be any of a number of different types of entities, including an individual or a business. The holdings of an investment account may also be manipulated by an entity managing or otherwise associated with the investment account, such as a money manager, a brokerage firm (sometimes referred to as a broker-dealer or a sponsor), or some other type of investment firm.

In managing investment account transactions, oftentimes restrictions are established that constrain the ability to use an investment account to trade security instruments, such as buying or selling stocks. For instance, a restriction might stipulate that no more than twenty percent of the total portfolio value of an investment account consist of stock holdings in the telecom industry, or that stock in a particular entity should never drop below ten percent of the total holdings of an investment account. In conventional securities trading systems, applicable restrictions are identified and examined when a set of trades are generated as a result of human investment decisions or automated system functions (e.g., rebalancing). A restriction may prevent one or more trades and may be associated with a resolution rule that stipulates an alternative action that should be performed when the restriction is violated.

Restrictions can be established by a money manager, investor, and/or the entity establishing the investment account (e.g., a broker-dealer or other client of the money manager), and can be scoped in different ways. For example, a restriction can apply to a single account, all accounts associated with a particular money manager, all accounts managed under a specific style, all accounts associated with a particular program offered to investors, or all accounts associated with a particular client of the money manager. Additionally, restrictions may be established or modified at any point in time, including before an initial allocation of assets, after an initial allocation, or even after one or more rebalancings. Additional information on restrictions and systems in which they are implemented is disclosed in U.S. application Ser. No. 11/146,045 titled "Automated Actions Based on Restrictions", filed Jun. 7, 2005, the entire contents of which are incorporated herein by reference as if set forth fully herein.

It will be appreciated that restrictions can fall into one of two categories. The first restriction category, security restrictions, include those restrictions whose violation determination is unaffected by other simultaneous trade orders for the same investment account. These are generally based on a static field as opposed to a field that can fluctuate based on the results of other trades. Illustrative examples of security restrictions include:

Do not buy if "ticker" equals "IBM"
Do not buy if "internal rating" is less that "3 stars"
Do not sell if "maturity date" is past "Jan. 01, 2007"
Do not buy if "industry sector" is "Telecom".

The second type of restriction is a trading or cash restriction. A trading or cash restriction is a restriction whose violation determination may be affected by other simultaneous trade orders for the same account. These are generally based on a factor that fluctuates as a result of the trades. Many times these restrictions will involve percentage comparisons or absolute dollar values. Illustrative examples of trading or cash restrictions include:

Do not buy if "% of account in Telecom sector" is greater than "30%"
Do not sell if "% of account in fixed income securities" is less than "20%"
Do not buy if "% of account held in cash" is less than "20%"
Do not sell if "$ value of account held in cash" is greater than "$50,000".

Prior art systems did not distinguish between the above two restriction types. Prior art systems simply received a list of pending trade orders to be executed and iterated through each pending order, determining whether it passed the applicable restriction criteria, and either executing or canceling the pending trade order accordingly. Such systems often operated correctly only if all applicable restrictions were static. However, for trading or cash restrictions impacted by the cumulative effect of multiple trade orders, prior art system results are less satisfactory—some trade orders are rejected that would otherwise be allowed if later processed trade orders are taken under consideration.

In the following illustrative example of a prior art system in which restrictions are processed, each trade order to be executed is individually evaluated against applicable restrictions with no consideration of the effect of other simultaneous trade orders. Assume, for instance, an account having a total market value of $101,733.70 and the following asset allocation:

TABLE 1

Illustrative Investment Account Allocation

| Security/Cash | Asset Class | # of Units | Price/Unit | Market Value | % of TMV |
|---|---|---|---|---|---|
| CKFR | Equity | 380 | $50.2500 | $19,095.00 | 18.77% |
| IBM | Equity | 250 | $88.3400 | $22,085.00 | 21.71% |
| POM-18 | Fixed Income | 25,000 | $1.0084 | $25,210.00 | 24.78% |
| CVX-D5 | Fixed Income | 14,000 | $1.0068 | $14,095.20 | 13.85% |
| Cash | Cash | — | — | $21,248.50 | 20.89% |
| TOTAL | | | | $101,733.70 | 100.00% |

To illustrate the shortfalls of prior art systems, assume a trading tool has generated the following three trade orders for sequential execution using the investment account of Table 1:

(1) Sell 112 shares of CKFR at $50.25/share. The market value of this trade order would be $5,268.00, which is 5.532% of the total market value of the illustrative investment account of Table 1.

(2) Buy 188 shares of MSFT at $25.02/share. The market value of this trade order would be $4,703.76, which is 4.624% of the total market value of the illustrative investment account of Table 1.

(3) Buy 10 shares of IBM at $88.34/share. The market value of this trade order would be $883.40, which is 0.868% of the total market value of the illustrative investment account of Table 1.

Further, assume the following three restrictions are identified as applicable to the above trade orders:

(A) Don't buy or sell if "Cash" is less than or equal to "18%";

(B) Don't buy or sell if "% of account in Equity asset class" is greater than "45%"

(C) Don't buy or sell if "% of account in Equity asset class" is less than "35%".

In a prior art system, the three trades (1)-(3) are each examined sequentially (and independently) against the three restrictions (A)-(C). The first trade (1) is processed but is rejected because of the third restriction (C); selling 112 shares of CKFR would drop the percentage of the account in the 'Equity' asset class (which initially is 40.48%, or 18.77%+ 21.71%) to 34.948%, which is less than the minimum of 35% stipulated by restriction (C). The system would next attempt to process the second trade (2). That trade is likewise rejected because restrictions (A) and (B) would be violated; buying 188 shares of MSFT would increase the percentage of the account in the 'Equity' asset class to 45.104% (40.48%+ 4.624%), which is more than the maximum of 45% stipulated by the second restriction (B). Additionally, 'Cash' would be reduced to $16,544.74, which, at 16.26% of the total market value of the account, is less than the 18% stipulated by the first restriction (A). Only after the rejection of the first two trades will the third and final trade (3) be processed. Unlike the other two trades in this illustrative example, this trade is executed, as the resulting 'Cash' percentage (20.02%) is not below the stipulated minimum percentage (18%), and the resulting 'Equity' asset class percentage (41.35%) remains in the appropriate range (35-45%) when the trade is executed. Thus, in the above example, only one of the three trades would be executed because the trades are considered independently and sequentially.

However, it will be appreciated that the three trade orders (1)-(3) are offsetting such that if they are considered together, they could all be executed without violating any of the restrictions (A)-(C). If all three trades are executed, the following asset allocation would result:

TABLE 2

Illustrative Investment Account Allocation
After Execution of Trades

| Security/Cash | Asset Class | # of Units | Price/Unit | Market Value | % of TMV |
|---|---|---|---|---|---|
| CKFR | Equity | 268 | $50.2500 | $13,467.00 | 13.24% |
| IBM | Equity | 260 | $88.3400 | 22,968.40 | 22.58% |
| MSFT | Equity | 188 | $25.02 | $4,703.76 | 4.62% |
| POM-18 | Fixed Income | 25,000 | $1.0084 | $25,210.00 | 24.78% |
| CVX-D5 | Fixed Income | 14,000 | $1.0068 | $14,095.20 | 13.85% |
| Cash | Cash | — | — | $21,289.34 | 20.93% |
| TOTAL | | | | $101,733.70 | 100.00% |

As shown in the above table, if all three trades are executed, the total percentage in the 'Equity' asset class would be 40.44% and the percentage in 'Cash' would be 20.93%. None of these results violate any of the restrictions (A)-(C). In stark contrast to the rejection of one or more trades based on restriction violations resulting from their sequential consideration, execution of all the trades will not result in violation of any of the restrictions.

It will be appreciated that it would be desirable for restriction processing to reduce, if not eliminate, the inappropriate rejections of trades that should otherwise be permitted when considered in combination with one or more other trades.

SUMMARY OF THE INVENTION

According to one embodiment of the invention, there is disclosed a method of processing trade orders. The method includes receiving two or more trade orders, and identifying, from the two or more trade orders at least one trade order that does not violate any of one or more stored restrictions, and at least one violating trade order that violates at least one of the one or more stored restrictions. The method also includes identifying an impact, on an account position, of the at least one trade order that does not violate any of the one or more stored restrictions, and determining whether the at least one violating trade order violates any of the one or more stored restrictions based at least in part on the identified impact, on the account position, of the at least one trade order that does not violate any of the one or more stored restrictions.

According to one aspect of the invention, the method includes ordering (or sorting) at least one of (i) the received two or more trade orders prior to identifying at least one trade order that does not violate any of the one or more stored restrictions; and (ii) the at least one violating order prior to determining whether the at least one violating trade order violates any of the one or more stored restrictions based at least in part on the identified impact, on the account position, of the at least one trade order that does not violate any of the one or more stored restrictions. According to another aspect of the invention, the ordering (or sorting) includes ordering the received two or more trades orders, or the at least one violating order, based on order type, order value, or an account associated with each of the received two or more trade orders or the at least one violating order. According to yet another aspect of the invention, identifying the at least one violating trade order that violates at least one of the one or more stored restrictions includes iteratively comparing each of the two or more orders against all of the one or more stored restrictions.

The method can also include approving the at least one violating trade order for execution. Additionally, the at least one violating order can be executed subsequent to approving the at least one violating trade order for execution. According to another aspect of the invention, the one or more stored restrictions are associated with one of a single investment account, an investment style under which one or more investment accounts are transacted, an investment program with which one or more investment accounts are associated, or a client with which one or more investment accounts are associated.

According to an aspect of the invention, the one or more stored restrictions can prohibit holding of a security in an investment account, prohibit holding less than a percentage of a security in an investment account, prohibit holding less than a monetary value of a security in an investment account, prohibit holding less than a pre-defined percentage of securities in a particular industry, or prohibit holding less than a pre-defined monetary value of securities in a particular industry. The one or more restrictions can also require holding of a security in an investment account, prohibit holding more than a percentage of a security in an investment account, prohibit holding more than a monetary value of a security in an investment account, prohibit holding more than a pre-defined percentage of securities in a particular industry, or prohibit holding more than a pre-defined monetary value of securities in a particular industry.

According to yet another aspect of the invention, identifying an impact, on an account position, of the at least one trade order that does not violate any of the one or more stored restrictions includes identifying an asset allocation in an account after execution of the at least one trade order that does not violate any of the one or more stored restrictions.

According to another embodiment of the invention, there is disclosed a computer-readable medium having stored thereon computer-executable instructions for performing all of the above methods.

According to yet another embodiment of the invention, there is disclosed a system for processing more than one trade order subject to one or more investment account restrictions. The system includes a memory configured to store one or more restrictions, and a processor configured to receive two or more orders to perform an investment account action. The processor is configured to identify at least one order, of the two or more orders, that does not violate any of the stored one or more restrictions, and to identify at least one violating order, of the two or more orders, that violates at least one of the stored one or more restrictions. The processor is further configured to determine that at least one violating order fails to violate any of the stored one or more restrictions when executed with the at least one order that does not violate any of the stored one or more restrictions.

According to one aspect of the invention, the processor is further configured to order the received two or more orders prior to determining that at least one violating order fails to violate any of the stored one or more restrictions when executed with the at least one order that does not violate any of the stored one or more restrictions. According to another aspect of the invention, the processor is further configured to order the received two or more orders based on order type, order value, the identity of an account associated with each order, or the type of account associated with each order. The processor can also process the received two or more orders to determine if performance of each order violates any of the stored one or more restrictions.

According to yet another aspect of the invention, the processor is configured to iteratively compare each of the received two or more orders against all of the stored one or more restrictions. The processor may further be configured to update an account position to reflect the execution of an order, of the two or more orders, that does not violate any of the stored one or more restrictions. Moreover, the processor may be configured to approve at least one of the two or more orders that does not violate any of the stored one or more restrictions.

According to another aspect of the invention, the memory is configured to store one or more restrictions prohibiting holding of a security in an investment account, prohibiting holding less than a percentage of a security in an investment account, prohibiting holding less than a monetary value of a security in an investment account, prohibiting holding less than a pre-defined percentage of securities in a particular industry, or prohibiting holding less than a pre-defined monetary value of securities in a particular industry. The memory can also be configured to store one or more restrictions requiring holding of a security in an investment account, prohibiting holding more than a percentage of a security in an investment account, prohibiting holding more than a monetary value of a security in an investment account, prohibiting holding more than a pre-defined percentage of securities in a particular industry, or prohibiting holding more than a pre-defined monetary value of securities in a particular industry.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto one or more general purpose computers, special purpose computers, or other programmable data processing apparatuses to produce a system of one or more machines, such that the instructions which execute on one or more computers or other programmable data processing apparatuses create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
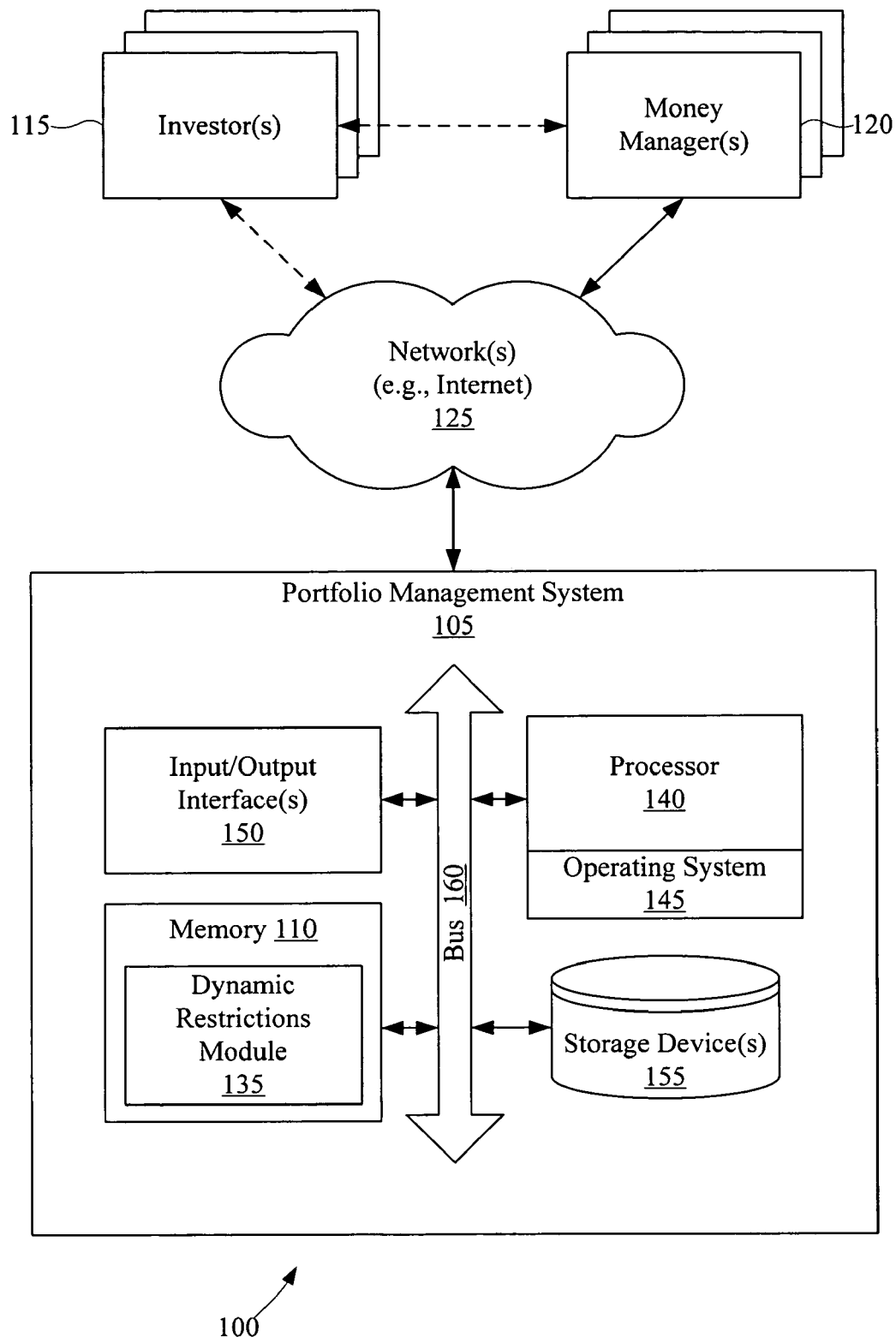
FIG. 1 shows a restrictions processing system, according to an illustrative embodiment of the present invention.

Referring now to FIG. 1, a restrictions processing system 100 in accordance with an illustrative embodiment of the present invention is shown. The restrictions processing system 100 generally includes a portfolio management system 105 operable to receive instructions from one or more investors 115 and/or one or more money managers 120. Among other functions, the portfolio management system 105 can receive trade orders, such as orders to buy or sell securities, and can execute such orders. As described in greater detail below, the portfolio management system 105 is further operable to collectively process trade orders subject to one or more restrictions. To effect such processing, the portfolio management system 105 includes at least one memory 110 and a dynamic restrictions module 135 stored therein to evaluate and process trade orders. In particular, the dynamic restrictions module 135 includes one or more algorithms operable to determine whether trades may be executed by considering the cumulative impact of restrictions on two or more trades.

As shown in FIG. 1, the investor(s) 115 and/or money manager(s) 120 may communicate with the portfolio management system 105 either directly or via one or more networks 125, such as a Local Area Network (LAN), a Wide Area Network (WAN), the Internet, or the like. Although the investor(s) 115 and/or money manager(s) 120 may communicate directly with the portfolio management system 105, the investor(s) 115 optionally may communicate with the money manager(s) 120, which may in turn communicate with the portfolio management system 105 on behalf of the investor(s) 115. For this reason, in FIG. 1 the communication directly between the investor(s) 115 and the one or more networks 125 is shown with a dashed line to indicate that the communication link is optional.

Although illustrated in FIG. 1 as communicating only with the investor(s) 115 and/or the money manager(s) 120, it should be appreciated that the portfolio management system 105 may interface to systems associated with one or more brokers, brokerage firms, investors, and/or other systems that conventionally communicate with investment management systems. Therefore, trade orders, restrictions, and the like may be received by the portfolio management system from entities other than the investor(s) 115 and money manager(s) 120. Communications with those systems may utilize the one or more networks 125 and/or may utilize one or more other networks (not illustrated) and/or dedicated communication links.

It will be appreciated that the methods of communicating with the portfolio management system 105 may include any method well known to those of ordinary skill in the art. Thus, the present invention is not limited to a system in which the portfolio management system 105 receives communications in a particular format or mode, or via particular hardware. For instance, although the present invention can be implemented by utilizing the Internet to facilitate communications directly between a particular investor and the portfolio management system 105, any variety of other communication methods can be used to interact with the portfolio management system 105, such as communications via a Plain Old Telephone Service and an Interactive Voice Response system. Moreover, although not described in detail herein, it will be appreciated that some or all communications in the system 100 shown in FIG. 1 may be secure to maintain the confidentiality of data and to authenticate users of the restrictions processing system 100.

As shown in FIG. 1, the exemplary portfolio management system 105 of the restrictions processing system 100 generally includes a processor 140, operating system 145, bus 160, input/output interface(s) 150, and one or more databases 155 in addition to the aforementioned dynamic restrictions module 135 residing within the memory 110. The bus 160 includes data and address bus lines to facilitate communication between the processor 140, operating system 145 and the other components within the portfolio management system 105, including the memory 110, the input/output (I/O) interface(s) 150 and the one or more databases 155. According to one aspect of the invention, the system 105 may represent a system of distributed components that are connected by the bus 106. The processor 140 executes the operating system 145, and together the processor 140 and operating system 145 are operable to execute functions implemented by the portfolio management system 110, including executing software applications stored in the memory 110, as is well known in the art.

Specifically, to implement the methods described herein, the processor 140 and operating system 145, with the I/O interface(s) 150, obtain the trade orders to be executed by the portfolio management system 105. According to one aspect of the invention, the dynamic restrictions module 135 stored within the memory 110 receives the trade orders, restrictions, optional trade sorting rules, and other trade-related information input into or received by the system 110. The dynamic restrictions module 135 includes one or more algorithms for processing that information to determine what trades, subject to restrictions, may be processed without violating restrictions, as is described hereinafter with respect to FIGS. 2-4. Therefore, the dynamic restrictions module 135 may be operable to execute computations of parameters, compare the parameters against criteria, process information, and the like, as needed to execute the methods described herein. It will be appreciated that the memory 110 may include random access memory, read-only memory, a hard disk drive, a floppy disk drive, a CD-Rom drive, a DVD-Rom drive, optical disk drive, or the like, for storing information on various computer-readable media.

In order to evaluate and dynamically process trade orders subject to restrictions, the dynamic restrictions module 135 utilizes information stored within the one or more databases 155, which may be connected to the bus 160 by an appropriate interface. The one or more databases 155 can include random access memory, read-only memory, a hard disk drive, a floppy disk drive, a CD-Rom drive, DVD-Rom drive, optical disk drive, or the like, for storing information on various computer-readable media, such as a hard disk, a removable magnetic disk, or a CD-ROM disk. In general, the one or more databases 155 provide non-volatile storage to the portfolio management system 105. It will be appreciated that the information stored within the one or more databases 155 may be provided by the money manager(s) 120, the investor(s) 115, the portfolio management system 110, and/or other entities in communication with the portfolio management system 110. The one or more databases 155 can store the trade orders, restrictions, optional trade sorting rules, and other trade-related information received by or generated by the portfolio management system 105 that the dynamic restrictions module 135 uses in the processes and computations described hereinafter. This information may be requested and/or retrieved by the dynamic restrictions module 135 as necessary to evaluate whether one or more trade orders should be executed.

It should be appreciated that although the dynamic restriction module 135 is described herein as software residing within the memory 110, the dynamic restrictions module 135 may alternatively include a combination of software and hardware, or only hardware. Furthermore, although illustrated as located entirely within the portfolio management system 105, one or more of the portfolio management system 105 components can be distributed such that they are in whole or part external to the portfolio management system 105. As an illustrative example, the one or more databases 155 may in fact be external to the portfolio management system 105. Additionally, it should be also appreciated by one of ordinary skill in the art that one or more of the portfolio management system 105 components described with respect to FIG. 1 may comprise several components, which are either local to each other or which operate in conjunction with each other to permit the dynamic restrictions module 135 to perform the processes described herein. Additionally, one or more of the portfolio management system 105 components may be combined and/or may be distributed on different computers, systems, platforms, and the like. Therefore, it should be appreciated that the illustrative system 100 shown in FIG. 1 is exemplary, and that almost any combination of software and/or hardware may be utilized to perform the functions described herein.

Figure 2:
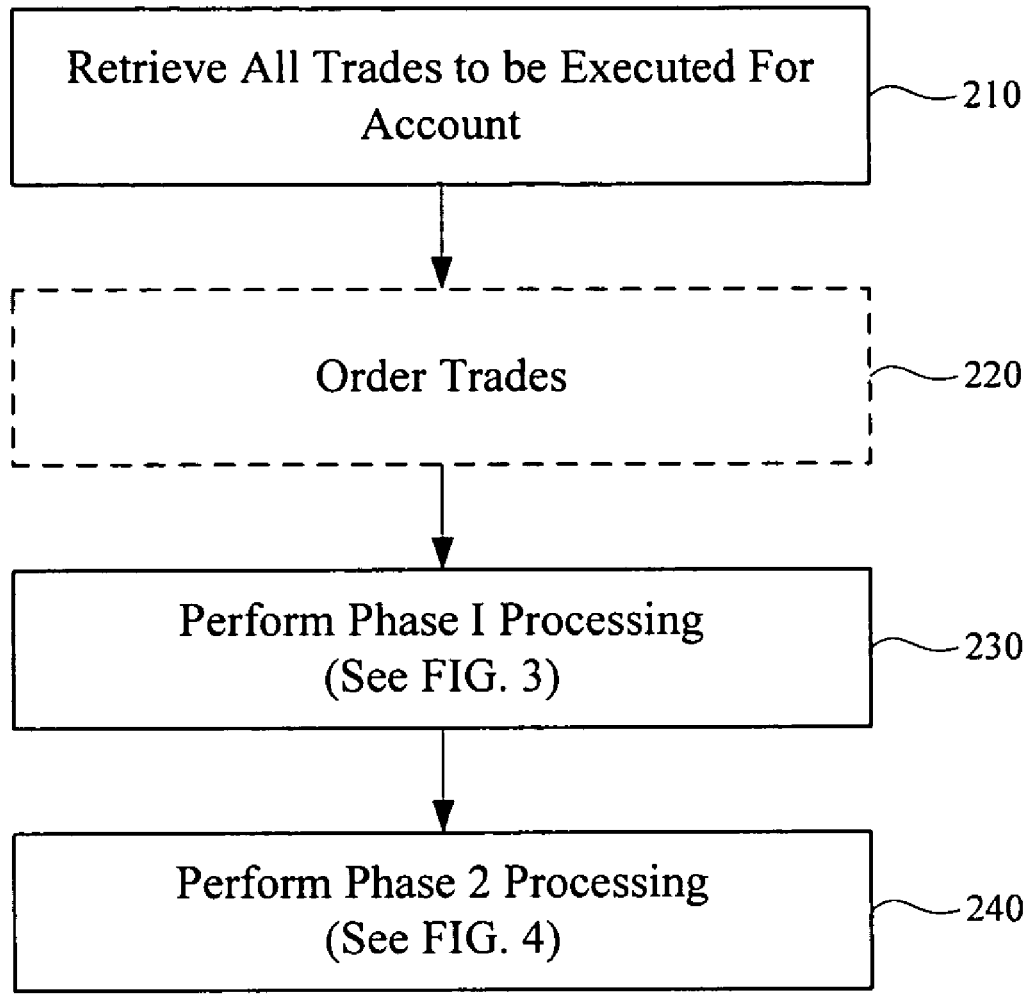
FIG. 2 depicts exemplary trade order processing performed in accordance with certain aspects of the present invention.

The methods and processes implemented by the dynamic restrictions module 135 are described next with respect to FIGS. 2-4. FIG. 2 is a block diagram flow chart of a high-level trade order processing flow implemented by the dynamic restrictions module 135, according to an embodiment of the invention. To begin processing of trade orders subject to restrictions, each of the trade orders are retrieved for a specific account (block 210). These orders may be initially received by the portfolio management system 110 via the input/output interface(s) 150, and may be stored and subsequently retrieved from the one or more databases 155 and/or memory 110. The trade orders may have been generated as a result of an investment decision (e.g., a decision made by an investor to buy or sell shares) or an automated function of the portfolio management system 100.

After the trade orders have been retrieved (block 210), the trade orders are optionally ordered according to pre-determined sorting rules (block 220). Because the ordering of trade orders is an optional step, the ordering of trades (block 220) is illustrated in dashed lines in the block diagram flow chart of FIG. 2. Trade orders may be ordered using a variety of sorting rules. For instance, all "sale" orders may have a higher priority than all "buy" orders, although the opposite is also possible. Within each group (i.e., within all "sale orders or within all "buy" orders), orders may be arranged based on ascending or descending trade value. According to another illustrative example, "sell" and "buy" orders may be alternated, beginning with either a "sell" order or a "buy" order. Although alternating, "sell" and "buy" orders may both be ordered based on descending value order, or alternatively, based on ascending trade value order. Additionally, trade orders may be ordered based on descending or ascending trade values, regardless of whether the trade order is a "buy" or "sell" order. It should also be recognized that any sorting rules may be used in accordance with embodiments of the present invention to order trades.

The ordering of trade orders may be based on human selection of one of the above-described illustrative approaches, or may be based on human ordering of specific trade orders.

According to an aspect of the invention, the portfolio management system 100 may allow the investor(s) 115 and/or money managers 120 to select pre-determined sorting rules. Alternatively, portfolio management system 100 may have and embedded set of sorting rules to order trades automatically, such as based on a group of accounts (e.g., by account style, program, or client) and/or types of restrictions. Sorting rules may be applicable to a particular investment account style or program, and may instruct what ordering approach should be used when multiple sorting rules apply to the same trade order. Additionally, precedence rules can define the ordering approach to use where more than one sorting rule applies. For example, an ordering approach for a specific account may be used if available, otherwise an ordering approach for the account style may be used. If neither approach are used, then an ordering approach based on the client should be used. It will be appreciated that these methods are illustrative, and that other ordering methods may be implemented.

One benefit of performing the sorting function (block 220) is a resultant increase in the overall efficiency of processing the trade orders. A further advantage of ordering trades is that conflicts between competing trade orders may be resolved. For example, if either one of two pending orders can be executed exclusive of the other to satisfy an applicable restriction, the sorting of the trade orders according to priority can resolve the conflict.

After the optional ordering of trade orders (block 220), the first phase of trade order processing commences (block 230) in which an initial iteration is performed through each of the trade orders. At the completion of the first phase (block 230), all of the trade orders will have been placed in a passed state (approved for execution) or in a pending state. According to an embodiment of the invention, the first phase of processing is illustrated and described in detail with reference to FIG. 3. After completion of the first phase of processing (block 230), trade orders placed in a pending state are further subjected to a second phase of processing (block 240). An embodiment of the second phase is depicted and described in detail with reference to FIG. 4. At the completion of the second phase of processing (block 240), all the orders that were in a pending state will have been placed in a passed state (approved for execution) or will have been rejected.

Figure 3:
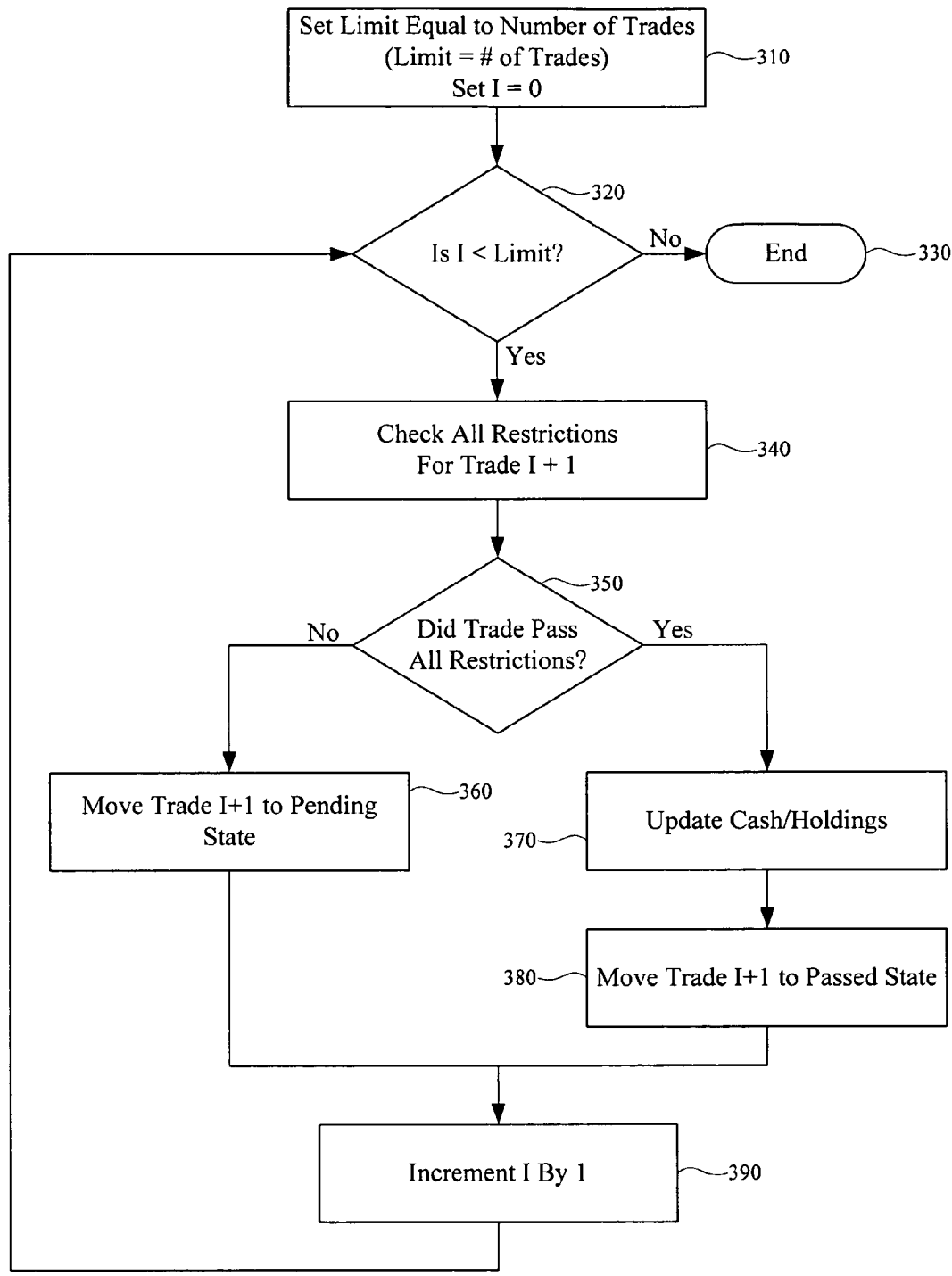
FIG. 3 depicts exemplary first phase processing performed in accordance with certain aspects of the present invention.

Referring now to FIG. 3, there is illustrated a simplified exemplary depiction of a first phase processing, according to an embodiment of the present invention. The first phase processing is performed by the dynamic restrictions module 135. After all trade orders for an account are retrieved (block 210), the first phase of trade order processing establishes or sets an iteration limit (block 310) equal to the total number of pending trades to be examined by the dynamic restrictions module 135. An index value 'I' is also initialized at 0 for use in iterating through the pending trade orders (block 310). It should be understood that the index value may be set at any value based in the parameters of the system.

Next, the dynamic restrictions module 135 determines if there is an additional trade order to be examined by determining if the current index value is less than the iteration limit set to the total number of pending trades (block 320). As shown in FIG. 3, this determination permits the dynamic restrictions module 135 to iteratively consider each trade sequentially and to stop comparing trades against restrictions after all trades are considered. Thus, if the index value 'I', which is iteratively incremented (block 390) after the consideration of each trade, is not less that the limit value, then the first phase of processing terminates (block 330). Otherwise, the dynamic restrictions module 135 will determine if the current trade order is subject to any restrictions (block 340). U.S. application Ser. No. 11/146,045, titled "Automated Actions Based on Restrictions" and incorporated by reference above describes the identification of applicable restrictions for a trade order. In checking for all restrictions for a particular trade order, the dynamic restrictions module 135 may access restrictions stored for each account, or associated with each trade order. As described above, this information may be stored within the memory 110 and/or within the one or more databases. According to one aspect of the invention, the dynamic restrictions module determines if the currently pending trade order, located in the memory 110 at the array location equal to the index location plus 1, is subject to any restrictions.

Each applicable restriction is identified and applied to the currently pending trade (block 350). In particular, the dynamic restrictions module 135 determines if the currently pending trade order (i.e., trade I+1) passed all of the restrictions to which it was subjected (block 350). If the currently pending trade order does not pass each of the applicable restrictions, the trade order is moved to a pending state (block 360) for further processing as described with respect to FIG. 4. A pending state indicates that the currently pending trade order has not passed the current restrictions, but will be reconsidered during the second phase of processing.

If the currently pending trade order passes all of the restrictions (block 350), the cash and security holdings of the investment account for which the trade order is pending are updated to reflect the effect of the processed trade order (block 370). To effect this update, the dynamic restrictions module may utilize one or more other components or processes of the portfolio management system 110, such as accounting software or the like. According to another aspect of the invention, temporary cash and/or security holdings fields may be updated to effect the processing and decisions described herein such that the actual cash and security values themselves are not updated. Next, the currently pending trade order is placed in a passed state (block 380), which indicates that the currently pending trade order has passed the current restrictions and will not be reconsidered during the second phase of processing. Finally, after the pending trade (trade I+1) is moved to a pending or passed state, the index value 'I' is incremented by 1 (block 390), and the above-described phase one processing continues in an iterative fashion, considering each additional trade against all possible restrictions.

It will be appreciated that the first phase processing of pending trade orders identifies those trades that pass all restrictions (i.e., those in the passed state), versus those that violate one or more restrictions (i.e., those that are in the pending state). After completion of the first phase processing of pending trade orders, the list of trade orders in a pending state (block 360) are processed during the second phase of trade order processing (block 240).

Figure 4:
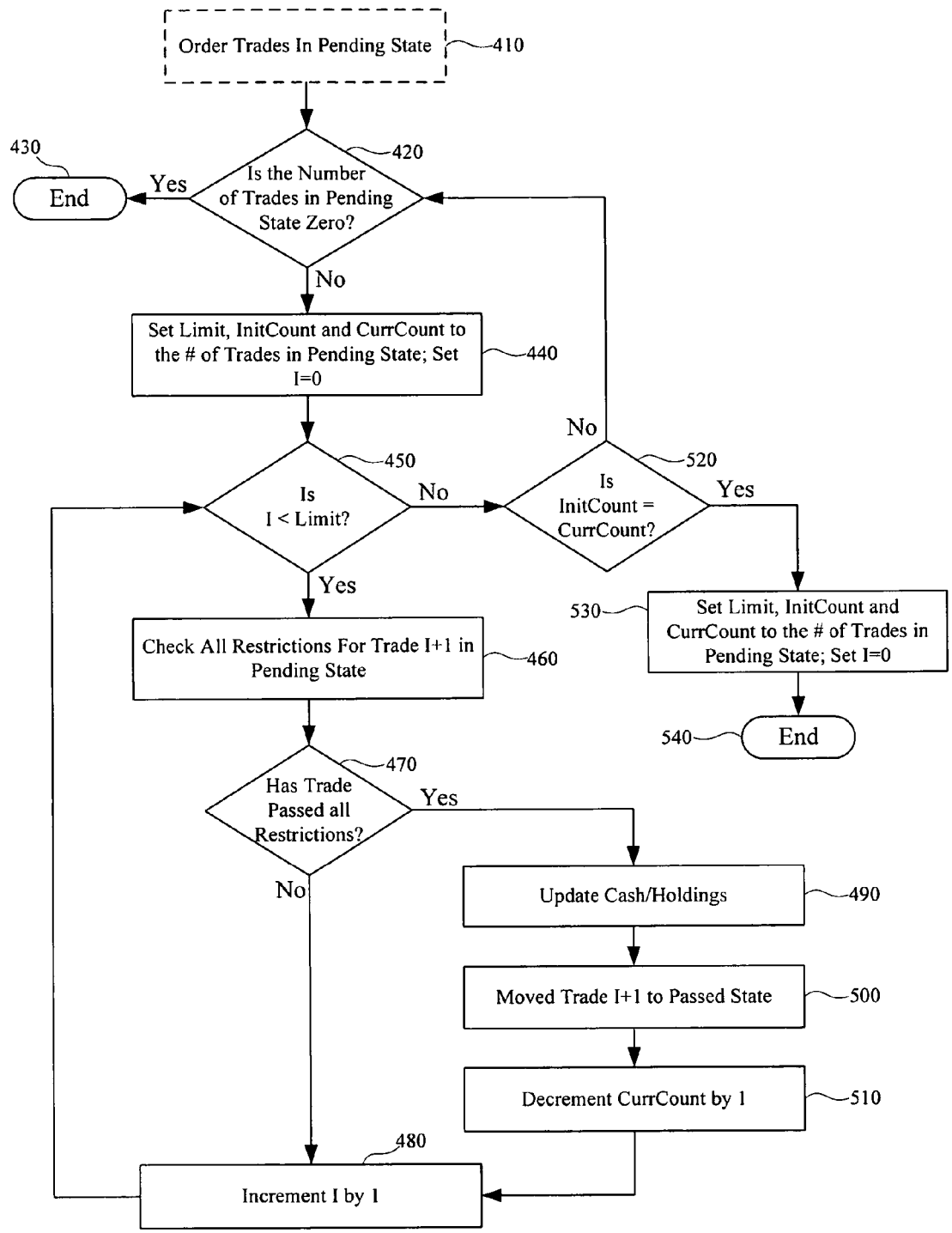
FIG. 4 depicts exemplary second phase processing performed in accordance with certain aspects of the present invention.

FIG. 4 is an illustrative depiction of a second phase processing performed by the dynamic restrictions module 135, according to an embodiment of the present invention. As with phase one processing, the phase two processing begins by an optional ordering of those trades placed in a pending state (block 360) during phase one processing (block 410). As was described with respect to the optional ordering of all trades (block 220) prior to execution of phase one processing (block 230), the optional ordering process (block 410) can be used to further enhance the overall efficiency of trade order processing and can reflect preferences of one type of trade versus another to help resolve conflicts. Examples of ordering include grouping "sell" trade orders first; grouping "buy" trade orders first; ordering by descending trade value; ordering by ascending trade value; alternating "sell" and "buy" trade orders; etc. It will be appreciated this is a non-exhaustive and illustrative list, and that any ordering parameters may be implemented in the portfolio management system 110.

After the optional ordering of pending trades (block 410), the dynamic restrictions module 135 is operable to determine whether the number of trade orders in a pending state is equal to 0. If the number of trade orders in a pending state is equal to 0, the processing ends (block 430). If the number of trade orders in a pending state is not equal to 0, the dynamic restrictions module 135 sets the index value 'I' to 0, and sets each of an iteration limit value, initial pending count, and current pending count equal to the current number of pending trade orders (block 440). Next, the dynamic restrictions module 135 determines whether the index value is less than the iteration limit value (block 450).

If the index value is not less that the iteration limit value (block 450), a comparison is made between the initial pending count and the current pending count (block 520). If these values are equal, all remaining pending trade orders are placed in a rejected state (block 530) and the process ends (block 540). However, if the comparison between the initial pending value and the current pending value reveals that they are not equal, the process restarts (block 420). Referring once again to the comparison of the index value to the limit (block 450), if the index value is less than the iteration limit value then the dynamic restrictions module determines if the currently pending trade order is subject to any restrictions (block 460) based upon the stored restrictions. According to one aspect of the invention, the currently pending trade order (trade I+1) is located in memory at the array location equal to the index location plus 1. Each applicable restriction is then identified and applied to the currently pending trade.

Next, the dynamic restrictions module 135 determines if the currently pending trade order passed all of the restrictions to which it was subjected. If the currently pending trade order does not pass each of the applicable restrictions (block 470), the index value is increased by 1 (block 480), and the process can repeat if any additional trades in pending state exist (block 450). However, if the dynamic restriction module 135 determines that the currently pending trade order passed all of the restrictions to which it was subjected (block 470), the cash and security holdings (or temporary cash and/or security holdings fields as described above) are updated (block 490) to reflect the effect of the processed trade order. Thereafter, the currently pending trade order is placed in a passed state (block 500), which indicates to the portfolio management system 110 that the currently pending trade order has passed the current restrictions, and does not require further consideration before execution. Finally, the current pending count is decreased by 1 (block 510), and the index value is increased by 1 (block 480). The process then continues until the number of trades in pending state are zero, or the initial pending count and current pending count are equal (i.e., the last pass through all the pending trade orders did not change the status of any).

Next, the illustrative asset allocation, trade orders, and restrictions previously discussed (in the background of the invention) with respect to a prior art system will be reconsidered with respect to the methods of the present invention. Assume, for instance, an account having a total market value of $101,733.70 and the following asset allocation:

TABLE 2

Illustrative Investment Account Allocation

| Security/Cash | Asset Class | # of Units | Price/Unit | Market Value | % of TMV |
|---|---|---|---|---|---|
| CKFR | Equity | 380 | $50.2500 | $19,095.00 | 18.77% |
| IBM | Equity | 250 | $88.3400 | $22,085.00 | 21.71% |
| POM-18 | Fixed Income | 25,000 | $1.0084 | $25,210.00 | 24.78% |
| CVX-D5 | Fixed Income | 14,000 | $1.0068 | $14,095.20 | 13.85% |
| Cash | Cash | — | — | $21,248.50 | 20.89% |
| TOTAL | | | | $101,733.70 | 100.00% |

Additionally, assume the following three trade orders for sequential execution using the investment account of Table 2:

(1) Sell 112 shares of CKFR at $50.25/share. The market value of this trade order would be $5,268.00, which is 5.532% of the total market value of the illustrative investment account of Table 2.

(2) Buy 188 shares of MSFT at $25.02/share. The market value of this trade order would be $4,703.76, which is 4.624% of the total market value of the illustrative investment account of Table 2.

(3) Buy 10 shares of IBM at $88.34/share. The market value of this trade order would be $883.40, which is 0.868% of the total market value of the illustrative investment account of Table 2.

Further, assume the following three restrictions are identified as applicable to the above trade orders:

(A) Don't buy or sell if "Cash" is less than or equal to "18%";

(B) Don't buy or sell if "% of account in Equity asset class" is greater than "45%"

(C) Don't buy or sell if "% of account in Equity asset class" is less than "35%".

The present invention may first order the trades. According to an illustrative example, the trades may be ordered in descending trade value. Thus, the trades will be places in order as (1), (2), and (3). At the end of Phase 1 processing described above, trades (1) and (2) would be placed in a pending state, and trade (3) will be in a passed stated. At that point the holdings of the account would be allocated as shown in Table 3:

TABLE 2

Illustrative Investment Account Allocation

| Security/Cash | Asset Class | # of Units | Price/Unit | Market Value | % of TMV |
|---|---|---|---|---|---|
| CKFR | Equity | 380 | $50.2500 | $19,095.00 | 18.77% |
| IBM | Equity | 260 | $88.3400 | $22,968.40 | 22.58% |
| POM-18 | Fixed Income | 25,000 | $1.0084 | $25,210.00 | 24.78% |
| CVX-D5 | Fixed Income | 14,000 | $1.0068 | $14,095.20 | 13.85% |
| Cash | Cash | — | — | $20,365.10 | 20.02% |
| TOTAL | | | | $101,733.70 | 100.00% |

As shown above, after the execution of trade (3) the Equity asset class percentage is 41.35%, and the cash percentage is at 20.02%.

The sale of CKFR will pass all restrictions during the first iteration in phase 2 processing because the percentage of the account in the equity asset class will be 35.818% (or 41.35%–5.532%) after execution of the trade, which is within the range of 35%-45% required by the restrictions. This results in the following an account allocation as shown in Table 3:

TABLE 3

Illustrative Investment Account Allocation

| Security/Cash | Asset Class | # of Units | Price/Unit | Market Value | % of TMV |
|---|---|---|---|---|---|
| CKFR | Equity | 268 | $50.2500 | $13,467.00 | 13.24% |
| IBM | Equity | 260 | $88.3400 | $22,968.40 | 22.58% |
| POM-18 | Fixed Income | 25,000 | $1.0084 | $25,210.00 | 24.78% |
| CVX-D5 | Fixed Income | 14,000 | $1.0068 | $14,095.20 | 13.85% |
| Cash | Cash | — | — | $25,993.10 | 25.55% |
| TOTAL | | | | $101,733.70 | 100.00% |

Phase 2 processing will continue because InitCount will equal 2 and CurrCount will equal 1 at the end of the first iteration. During the second iteration of Phase 2 processing, trade (2) (the purchase of MSFT) will execute because the toal equity asset class percentage and the cash percentages will fall within acceptable ranges of the restrictions after execution of the trade. After the second iteration no more pending items exist, and phase 2 processing ends. Table 4 shows the resulting account allocation after execution of all three trades using the present invention:

TABLE 4

Illustrative Investment Account Allocation

| Security/Cash | Asset Class | # of Units | Price/Unit | Market Value | % of TMV |
|---|---|---|---|---|---|
| CKFR | Equity | 268 | $50.2500 | $13,467.00 | 13.24% |
| IBM | Equity | 260 | $88.3400 | $22,968.40 | 22.58% |
| MSFT | Equity | 188 | 25.0200 | $4,703.06 | 4.62% |
| POM-18 | Fixed Income | 25,000 | $1.0084 | $25,210.00 | 24.78% |
| CVX-D5 | Fixed Income | 14,000 | $1.0068 | $14,095.20 | 13.85% |
| Cash | Cash | — | — | $21,289.34 | 20.93% |
| TOTAL | | | | $101,733.70 | 100.00% |

It will be appreciated that the processes described above with respect to FIGS. 3 and 4 may be implemented by the dynamic restrictions module 135, which may be executed by the processor 140. As described with respect to FIG. 4, the phase two processing (block 240) permits the present invention to iteratively consider trades that, considered alone, individually did not pass restrictions. However, the methods implemented by the present invention permit execution of such trades. Thus, the present invention provides a technical advantage over prior art systems by processing a greater number of trades subject to dynamic restrictions.

According to another embodiment of the present invention, a permutational approach can be used to process multiple trade orders subject to restrictions. Using a permutational approach, each trade order is evaluated individually to determine whether they pass all applicable restrictions. Subsequently, the remaining trade orders are considered in permutations of sets of two. Likewise, the permutations continue for increasingly larger groups until the full set of remaining trade orders are considered in all of its permutations. It should be understood that each permutation of a group of pending trade orders must succeed for the grouping to succeed as a whole. For instance, if there are three pending trades T1, T2, and T3 after phase 1 processing, then permutational processing may check restrictions for the following trades, whether singularly or in combination:

T1
T2
T3
T1-T2 and T2-T1 (both of which must succeed for the combination to pass)
T1-T3 and T3-T1 (both of which must succeed for the combination to pass)
T2-T3 and T3-T2 (both of which must succeed for the combination to pass)
T1-T2-T3 and T1-T3-T2 and T2-T1-T3 and T2-T3-T1 and T3-T1-T2 and T3-T2-T1 (all of which must succeed for the combination to pass)

Another approach to processing multiple trade orders subject to dynamic restrictions is to store a "before" picture of the account prior to attempting to execute trade orders. A temporary "after" picture of the account is then created reflecting the potential results of executing a particular group of trade orders. The net effect of the trades is all that is considered and the particular order in which they are executed becomes unimportant. This approach achieves higher efficiency as the largest combinations of the pending trade orders are considered first, thus potentially diminishing the total amount of processing. Thus, using the illustrative example from immediately above, the permutational processing may process the trades and combination of trades in reverse over, starting with the combinations of three trades, T1, T2, and T3, and ending with evaluation of single trades.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

That which is claimed:

1. A method, comprising:
   receiving a group of trade orders, wherein the group includes at least a first trade order and a second trade order, for an investment account, wherein one or more restrictions are stored in association with the investment account;
   processing, by a portfolio management system comprising one or more computers, the group of trade orders according to at least two phases by:
      during a first phase, (i) placing the first trade order in a respective pending state based upon determining that the first trade order violates at least one of the one or more stored restrictions, whereby the first trade order is not approved for execution based upon its placement in the respective pending state; (ii) placing the second trade order in a respective passed state subsequent to determining that the second trade order does not violate at least a subset of the one or more stored restrictions; and (iii) updating at least one of a temporary cash holdings field or a temporary security holdings field associated with the investment account to reflect an anticipated effect of an execution of the second trade order, wherein the temporary cash holdings field or the temporary security holdings field is updated prior to the any actual execution of the second trade order; and
      during a second phase following the first phase, reconsidering one or more trade orders in the respective pending state, thereby (i) determining, subsequent to updating at least one of the temporary cash holdings field or the temporary security holdings field of the investment account, that the first trade order does not violate no longer violates the at least one of the one or more stored restrictions, and (ii) moving the first trade order from the respective pending state to the respective passed state;
      wherein a result of processing the group of trade orders is that both the first and second trade orders are both approved for execution based upon both the first and second trade orders being in the respective passed state.

2. The method of claim 1, further comprising: ordering, by the portfolio management system, the received group of trade orders prior to processing the group of trade orders.

3. The method of claim 2, wherein ordering comprises ordering the received group of trade orders based on order type or trade value.

4. The method of claim 3, wherein ordering based upon order type comprises (i) grouping "sell" trade orders first, (ii) grouping "buy" trade orders first, or (iii) alternating "sell" trade orders and "buy" trade orders, and wherein ordering based upon trade value comprises (i) ordering by ascending trade value or (ii) ordering by descending trade value.

5. The method of claim 1, wherein determining that the first trade order violates at least one of the one or more stored restrictions comprises iteratively comparing each of the trade orders against at least a subset of the one or more stored restrictions.

6. The method of claim 1, further comprising:
   executing, by the portfolio management system, the first trade order subsequent to processing the group of trade orders that resulted in the first trade order being in the respective passed state.

7. The method of claim 1, wherein the one or more stored restrictions are further associated with an investment style of a plurality of investment styles of the investment account, an investment program associated with the investment account, or a client associated with the investment account.

8. The method of claim 1, wherein the one or more stored restrictions: prohibit holding of a security in the investment account; prohibit holding less than a percentage of a security in the investment account; prohibit holding less than a monetary value of a security in the investment account; prohibit holding less than a pre-defined percentage of securities in a particular industry; prohibit holding less than a pre-defined monetary value of securities in a particular industry; require holding of a security in the investment account; prohibit holding more than a percentage of a security in the investment account; prohibit holding more than a monetary value of a security in the investment account; prohibit holding more than a pre-defined percentage of securities in a particular industry; or prohibit holding more than a pre-defined monetary value of securities in a particular industry.

9. The method of claim 1, wherein updating at least one of the temporary cash holdings field or the temporary security holdings field includes updating an asset allocation associated with the investment account to reflect an effect of an execution of the second trade order, wherein the updated asset allocation is utilized in determining that the first trade order does not violate the at least one of the one or more stored restrictions.

10. The method of claim 1, wherein actual cash holdings or actual security holdings are updated following actual execution of the first trade order or the second trade order.

11. The method of claim 1, wherein the group of trade orders includes a third trade order, and further comprising: during the first phase, determining, that the third trade order violates at least one of the one or more stored restrictions, whereby the third trade order is placed in a respective pending state; and during the second phase, ordering the trade orders that are in the respective pending state, including the first trade order and the third trade order, prior to determining, subsequent to updating at least one of the temporary cash holdings field or the temporary security holdings field associated with the investment account, that the first trade order no longer violates any of the one or more stored restrictions.

12. A system, comprising:
at least one memory configured to store one or more restrictions; and
at least one processor configured to receive a group of trade orders, wherein the group includes at least a first trade order and a second trade order, for an investment account;
wherein the at least one processor is configured to process the group of trade orders according to at least two phases by:
during a first phase, (i) place the first trade order in a respective pending state based upon determining that the first trade order violates at least one of the one or more stored restrictions, whereby the first trade order is not approved for execution based upon its placement in the respective pending state; (ii) place the second trade order in a respective passed state subsequent to determining that the second trade order does not violate at least a subset of the one or more stored restrictions; and (iii) update at least one of a temporary cash holdings field or security holdings field associated with the investment account to reflect an anticipated effect of an execution of the second trade order, wherein the temporary cash holdings field or the temporary security holdings field is updated prior to any actual execution of the second trade order; and
during a second phase following the first phase, reconsidering one or more trade orders in the respective pending state, thereby (i) determining, subsequent to updating at least one of the temporary cash holdings field or the temporary security holdings field of the investment account, that the first trade order no longer violates the at least one of the one or more stored restrictions, and (ii) moving the first trade order from the respective pending state to the respective passed state;
wherein a result of processing the group of trade orders is that both the first and second trade orders are both approved for execution based upon both the first and second trade orders being in the respective passed state.

13. The system of claim 12, wherein the at least one processor is further configured to order the received group of orders prior to processing the group of trade orders.

14. The system of claim 13, wherein the at least one processor is further configured to order the received group of trade orders based on order type or trade value.

15. The system of claim 14, wherein the at least one processor is configured to order based upon order type by (i) grouping "sell" trade orders first, (ii) grouping "buy" trade orders first, or (iii) alternating "sell" trade orders and "buy" trade orders, and wherein the at least one processor is configured to order based upon trade value by (i) ordering by ascending trade value or (ii) ordering by descending trade value.

16. The system of claim 12, wherein the at least one processor is further configured to iteratively compare each of the trade orders against all of the stored one or more restrictions.

17. The system of claim 12, wherein the at least one memory configured to store one or more restrictions further comprises at least one memory configured to store restrictions:
prohibiting holding of a security in the investment account;
prohibiting holding less than a percentage of a security in the investment account;
prohibiting holding less than a monetary value of a security in the investment account;
prohibiting holding less than a pre-defined percentage of securities in a particular industry;
prohibiting holding less than a pre-defined monetary value of securities in a particular industry;
requiring holding of a security in the investment account;
prohibiting holding more than a percentage of a security in the investment account;
prohibiting holding more than a monetary value of a security in the investment account;
prohibiting holding more than a pre-defined percentage of securities in a particular industry; or
prohibiting holding more than a pre-defined monetary value of securities in a particular industry.

18. The system of claim 12, wherein the at least one processor is configured to update actual cash holdings or actual security holdings following actual execution of the first trade order or the second trade order.

19. The system of claim 12, wherein the group of trade orders includes a third trade order, and wherein the at least one processor is further configured to:
during the first phase, determine that the third trade order violates at least one of the one or more stored restrictions, whereby the third trade order is placed in a respective pending state; and
during the second phase, order the trade orders that are in the respective pending state, including the first trade order and the third trade order, prior to determining, subsequent to updating at least one of the temporary cash holdings field or the temporary security holdings field associated with the investment account, that the first trade order no longer violates any of the one or more stored restrictions.

20. The system of claim 12, wherein the at least one processor is further configured to execute the first trade order subsequent to processing the group of trade orders that resulted in the first trade order being in the respective passed state.

21. The system of claim 12, wherein the one or more stored restrictions are further associated with an investment style of a plurality of investment styles of the investment account, an investment program associated with the investment account, or a client associated with the investment account.

22. The system of claim 12, wherein the update of at least one of the temporary cash holdings field or the temporary security holdings field associated with the investment account includes updating an asset allocation associated with the investment account to reflect an effect of an execution of the second trade order, wherein the updated asset allocation is utilized in determining that the first trade order no longer violates the at least one of the one or more stored restrictions.

* * * * *